United States Patent [19]
Amatucci et al.

[11] Patent Number: 5,630,993
[45] Date of Patent: May 20, 1997

[54] LOW TEMPERATURE SYNTHESIS OF LAYERED LITHIATED TRANSITION METAL OXIDES

[75] Inventors: Glenn G. Amatucci, Raritan; Jean-Marie Tarascon, Martinsville, both of N.J.

[73] Assignee: Bell Communications Research, Inc., Morristown, N.J.

[21] Appl. No.: 498,315

[22] Filed: Jul. 5, 1995

[51] Int. Cl.$^6$ .......................... C01G 51/04; C01G 53/04
[52] U.S. Cl. .................... 423/594; 423/593; 429/218; 429/223
[58] Field of Search .................... 423/593, 594, 423/599

[56] References Cited

U.S. PATENT DOCUMENTS

| | | | |
|---|---|---|---|
| 2,545,424 | 11/1951 | Ellestad et al. | 423/594 |
| 5,192,629 | 3/1993 | Guyomard et al. | 429/197 |
| 5,211,933 | 5/1993 | Barboux et al. | 423/594 |
| 5,264,201 | 11/1993 | Dahn et al. | 423/594 |
| 5,296,318 | 3/1994 | Gozdz et al. | 429/19 |
| 5,418,091 | 5/1995 | Gozdz et al. | 429/252 |

OTHER PUBLICATIONS

P. Barboux et al., "The Use of Acetates as Precursors for the Low–Temperature Synthesis of $LiMn_2O_4$ and $LiCoO_2$ ... ", *Journal of Solid State Chemistry*, 94, 185–196 (1991).

R. J. Gummow et al., "Structure and Electrochemistry of Lithium Cobalt Oxide Synthesized at 400°C", *Mat. Res. Bull.*, vol. 27, pp. 327–337 (1992)/

E. Rossen et al., "Synthesis and electrochemistry of spinel $LT-LiCoO_2$", *Solid State Ionics*, 62, 53–60 (1993).

J. N. Reimers et al., "Synthesis and Electrochemical Studies of $LiMnO_2$ Prepared at Low Temperatures", *J. Electrochem. Soc.*, (May 1993).

J. M. Fernandez–Rodriguez et al., "Low–Temperature Hydrothermal Transformation of $LiCoO_2$ And $HCoO_2$", *Mat. Res. Bull.*, vol. 23, pp. 899–904, (1988).

Tabuchi et al, "Preparation of $AFeO_2$ (A=Li,Na) by Hydrothermal Method, " *Solid State Ionics*, 79, Jul. 1995, pp. 220–226 (Abstract only).

*Primary Examiner*—Wayne Langel
*Attorney, Agent, or Firm*—Lionel N. White

[57] ABSTRACT

A method of making a single phase, layered lithiated transition metal oxide material which comprises reacting a transition metal hydroxide with a lithium source in a basic solution in the presence of water at a pressure greater than atmospheric and at a temperature of from about 50° C. to 150° C.

13 Claims, 6 Drawing Sheets

LOW TEMPERATURE SYNTHESIS OF LAYERED LITHIATED TRANSITION METAL OXIDES

BACKGROUND OF THE INVENTION

The increasing commercial importance of rechargeable lithium ion battery cells has prompted a desire to identify and to prepare cathode materials better able to reversibly intercalate lithium ions at higher voltages. There are three prominent reversible lithium intercalation compounds used for lithium ion rechargeable batteries; namely, $LiCoO_2$ and $LiNiO_2$ compounds, and $LiMn_2O_4$ spinel.

The present invention relates to a method of making hexagonal lithiated metal oxide materials at reduced temperatures. More particularly, the invention relates to a method of synthesizing lithium cobalt oxide or lithium nickel oxide products which is economical and which yields products having good electrochemical properties. The invention also relates to a method of producing a cobalt hydroxide precursor.

$LiCoO_2$ cells are of particular interest because of their ability to insert/deinsert lithium reversibly at voltages greater than 4 V, resulting in batteries that have an output voltage and an energy density three times greater than Ni—Cd cells. Lithium cobalt oxide adopts a hexagonal structure consisting of $CoO_2$ layers separated by Van der Waals gap. The octahedral sites within the Van der Waals gap are occupied by the Li ions. This results in the reversible intercalation of lithium. $LiNiO_2$ is isostructural with $LiCoO_2$ and is commercially viable for use in secondary lithium ion batteries.

Lithium secondary batteries are described for instance in U.S. Pat. Nos. 5,296,318 and 5,418,091 to Gozdz et al., both of which are incorporated in their entirety herein by reference. Lithium metal-free "rocking chair" batteries may be viewed as comprising two lithium-ion-absorbing electrode "sponges" separated by a lithium-ion conducting electrolyte usually comprising a $Li^+$ salt dissolved in a non-aqueous solvent or mixture of such solvents. Numerous such salts and solvents are known in the art as evidenced in Canadian Patent Publication No. 2,002,191, dated Jan. 30, 1991.

U.S. Pat. No. 5,192,629, which is herein incorporated by reference in its entirety, provides a class of electrolyte compositions that are exceptionally useful for minimizing electrolyte decomposition in secondary batteries comprising strongly oxidizing positive electrode materials. These electrolytes are uniquely capable of enhancing the cycle life and improving the temperature performance of practical "rocking chair" cells. These electrolyte compositions have a range of effective stability extending up to about 5.0 V at 55° C., as well as at room temperature (about 25° C.).

A substantial cost in the fabrication of lithium secondary batteries is the cost of electrode material resulting from the price of Co- or Ni-based precursors plus the processing cost. Prior methods of synthesizing $LiCoO_2$ include heating to temperatures of from 800° C. to 900° C. Reduction of the synthesis temperature of $LiCoO_2$ would result in significant savings in the energy and cost in the production of these electrode materials.

Barboux et al., *Journal of Solid State Chemistry*, 94, (1191) 185, have reported a low temperature sol-gel approach to the synthesis of $LiCoO_2$, but temperatures greater than 700° C. are still necessary to obtain poorly crystalline powders of $LiCoO_2$. R. J. Gummow et al., *Mat. Res. Bull.*, 27 (1992), 327, and E. Rossen et al., *Solid State Ionics*, 62 (1993) 53, tried to prepare $LiCoO_2$ at low temperature (400° C.) from $CoCO_3$ and obtained a compound which they called "LT $LiCoO_2$". This material adopts a spinel (cubic) rather than an hexagonal structure. The LT $LiCoO_2$ phase, which does not present any interest from an electrochemical point of view, transforms to the hexagonal $LiCoO_2$ phase at temperatures greater than 600° C. Such a $LiCoO_2$ spinel structure results most likely from the fact, as suggested by Barboux et al., that the phase grows or nucleates from the cubic $Co_3O_4$ spinel.

Reimers et al., in *J. Electrochem. Soc.* (May 1993), reported a low-temperature synthesis method for $LiMnO_2$. The material produced by Reimers et al. at low temperatures, e.g., 400° C., however, was unlike lithium manganese oxide produced at high temperatures and exhibited inferior electrochemical properties. Other low temperature processes have been attempted; for example, Fernandez-Rodriquez et al., in *Mat. Res. Bull.*, Vol. 23, pp. 899–904, report unsuccessful attempts to form $LiCoO_2$ from $HCoO_2$ at 200° C.

SUMMARY OF THE INVENTION

Applicants have discovered an advantageous method of forming layered structure lithium cobalt dioxide and lithium nickel dioxide materials which employs low temperatures, i.e., not exceeding 150° C., yet provides good electrochemical properties in the materials. The present invention is directed to this simple and cost-efficient method of making lithiated transition metal oxides at low temperatures.

In one aspect, the invention relates to a method of making an alkali metal oxide of the formula $$H_xA_{1-x}MO_2$$

wherein A is an alkali metal of group Ia, x is a number from 0.99 to 0 (depending upon the progress of the synthesis reaction), and M is a transition metal, the method comprising reacting an alkali metal ion source in a basic solution with MOOH, wherein M is as defined above, in the presence of water at a temperature of from about 50° C. to about 150° C. and at a pressure greater than atmospheric.

In another aspect, the invention relates to a method of making a lithium transition metal oxide of the formula $$H_xLi_{1-x}MO_2$$

wherein x is a number from 0.99 to 0 and M is a transition metal, the method comprising reacting a lithium ion source in a basic solution with MOOH, wherein M is as defined above, in the presence of water at a temperature of from about 50° C. to about 150° C. and at a pressure greater than atmospheric.

In a further aspect, the invention relates to a method of making lithium cobalt oxide of the formula $$H_xLi_{1-x}CoO_2$$

wherein x is a number from 0.99 to 0, the method comprising reacting a lithium ion source in a basic solution with CoOOH in the presence of water at a temperature of from about 50° C. to about 150° C. and at a pressure greater than atmospheric.

In a still further aspect, the invention relates to a method of making a lithium nickel oxide of the formula $$H_xLi_{1-x}NiO_2$$

wherein x is a number from 0.99 to 0, the method comprising reacting a lithium ion source in a basic solution with NiOOH in the presence of water at a temperature of from about 50° C. to about 150° C. and at a pressure greater than atmospheric.

BRIEF DESCRIPTION OF THE DRAWING

The present invention will be described with reference to the accompanying drawing of which.

DESCRIPTION OF THE INVENTION

According to the present invention lithium cobalt oxide and lithium nickel oxide having desirable properties can be synthesized at temperatures well below 800°–900° C. This has been accomplished through the use of an MOOH starting material in which M is a transition metal.

More particularly, an alkali metal oxide material of the formula $$H_xA_{1-x}MO_2$$

wherein A is an alkali metal of group Ia, x is a number from 0.99 to 0 (depending upon the progress of the synthesis reaction), and M is a transition metal, can be synthesized by reacting an alkali metal ion source in a basic solution with MOOH, wherein M is a transition metal, in the presence of an ion exchange medium, such as water, at a pressure greater than atmospheric. Preferably M is selected from cobalt and nickel. Preferably A is an alkali metal of group Ia selected from lithium, sodium, and potassium. More preferably, the alkali metal for use in the present invention is lithium.

The temperature of the reaction is preferably from about 50° C. to about 150° C., more preferably from about 80° C. to about 130° C., and most preferably from about 100° C. to 130° C. The reaction is preferably carried out at a pH of from about 8 to about 14, preferably from about 12 to about 14. Generally, the reaction temperature may be lowered with increased pH of the composition.

The pressure is selected to maintain the presence of water. The pressure of the reaction should therefore be at least greater than atmospheric. The pressure of the reaction is preferably from $1 \times 10^5$ Pa to about $3 \times 10^6$ Pa, more preferably between about $2 \times 10^5$ Pa and about $1 \times 10^6$ Pa, most preferably between about $6 \times 10^5$ Pa and about $1 \times 10^6$ Pa. It may be possible, with a high pH to run the reaction under reflux. The skilled artisan will clearly understand the relationship of temperature, pressure and pH and can readily select appropriate conditions.

The reaction is carried out at the selected temperature and pressure to synthesize the desired alkali metal oxide. The reaction time is preferably from about 1 day to about 20 days, more preferably from about 2 days to about 10 days and most preferably from about 3 days to about 5 days.

This reaction may be carried out at a 1 to 1 ratio of alkali metal to transition metal; however, it is preferably carried out in a stoichiometric excess of alkali metal. More preferably the reaction is carried out in a molar excess of alkali metal from about 1.05 to about 5.0, most preferably in a molar excess of about 1.5 to about 2.5.

Figure 1:
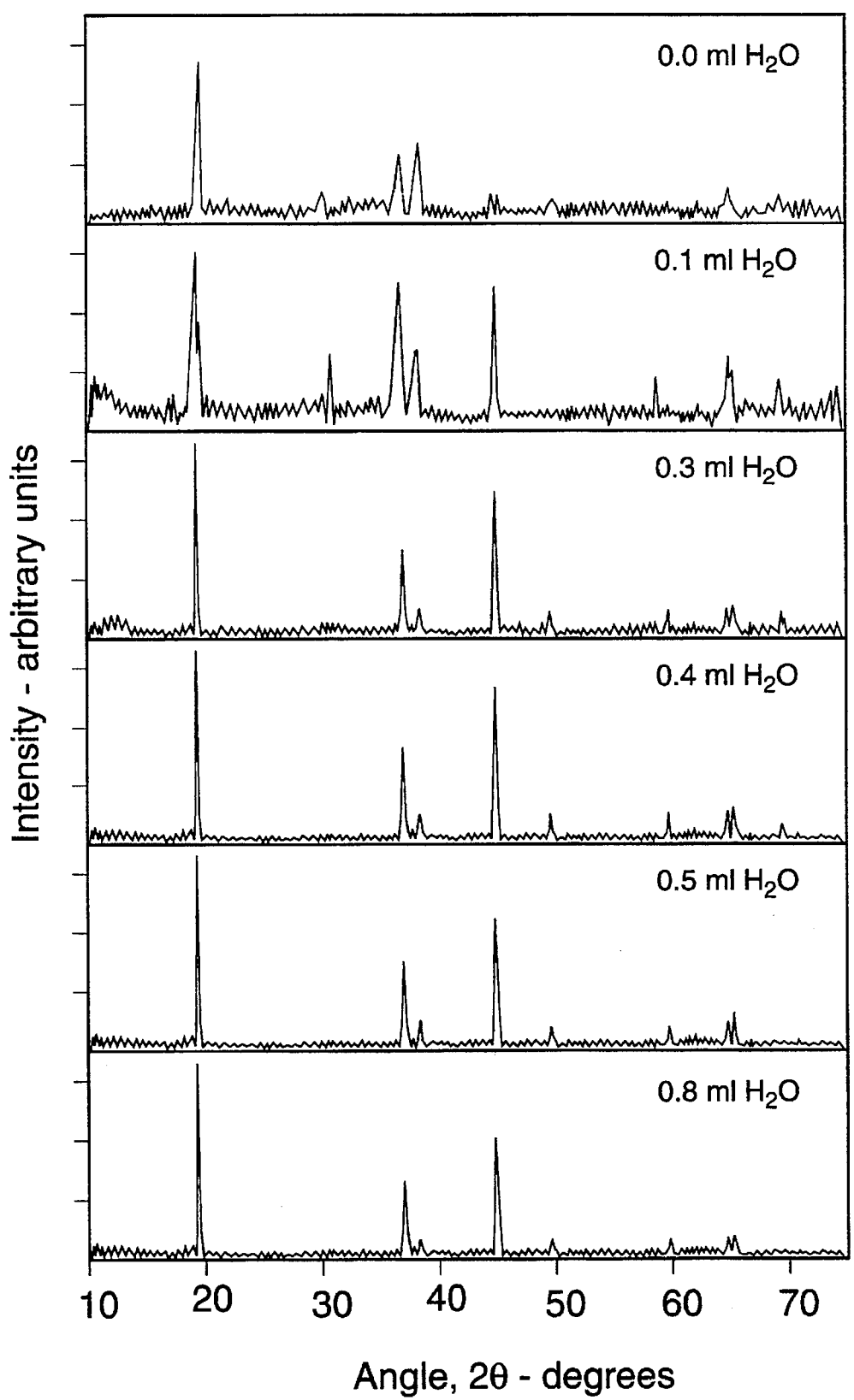
FIG. 1 shows X-ray diffraction patterns of $LiCoO_2$ prepared according to the present invention at varying degrees of $H_2O$ saturation.

The reaction is further preferably carried out in a saturation of water. The effect of the degree of water saturation on the reaction product is shown in the $LiCoO_2$ X-ray diffraction patterns of FIG. 1 which were obtained in a series of syntheses where the amount of water ranged from 0 to 0.8 ml/0.4 grams of CoOOH. A substantially total saturation of the reaction composition occurred at about 0.4 ml. The skilled artisan can readily determine the appropriate water content necessary to carry the reaction to substantial completion, as described.

It has been demonstrated that Li can be completely removed from $LiCoO_2$ while maintaining a layered structured. Electrochemically synthesized $CoO_2$ powders are able to reintercalate lithium in a secondary battery to give the $LiCoO_2$ phase, a direct indication of the fully reversible Li insertion process within the $LiCoO_2$ phase.

The $CoO_2$ phase which is made electrochemically at a voltage of 5 V is significantly unstable in a moisture-containing environment. Indeed, this phase reacts as follows:

$$2H_2O \rightarrow O_2 + 4H^+ + 4e^- \tag{1}$$

$$CoO_2 + 4e^- + 4H^+ \rightarrow H_xCoO_2 \tag{2}$$

The resulting $H_xCoO_2$, or CoOOH, phase has the same layered structure as $LiCoO_2$, and is known in the literature, e.g., JCPDS Powder Diffraction Files, under the name of heterogenite-(3R). The heterogenite phase reported in Kondrashev and Fedorova, *Doklady AKaD. Nank.*, 94, 229, 1954, was prepared by boiling β-Co(OH)$_2$ in water.

$H_xCoO_2$ formed from electrochemically synthesized $CoO_2$, as described in reaction (2) above, is a starting material from which lithium cobalt oxide can be produced at low temperatures. An exchange of the proton can be effected at low temperatures by reacting $H_xCoO_2$ with $LiOH \cdot H_2O$ according to following reaction.

$$H_xCoO_2 + LiOH \cdot H_2O \rightarrow LiCoO_2 + LiOH \text{ in water} \tag{3}$$

The electrochemical preparation of $CoO_2$ being volume limited, it was desired to find alternative methods of preparing the $H_xCoO_2$ precursor phase. It has now been discovered that large amounts of single phase $H_xCoO_2$ can be obtained by thermal oxidation of β-Co(OH)$_2$ under oxygen, as follows:

$$\beta\text{-Co(OH)}_2 \xrightarrow[\Delta]{O_2} H_xCoO_2 \tag{4}$$

The reaction is preferably carried out at a temperature of from about 120° C. to about 130° C. for a period of from about 10 hours to about 2 days. The reaction is more preferably carried out at a temperature of about 125° C. for a period of about 24 hours. In preferred embodiments, the material is removed and ground at intervals. The resulting $H_xCoO_2$ can now be used as the precursor in reaction (3) to obtain single phase $LiCoO_2$ at a temperature of about 100° C. according to the present invention.

Figure 2:
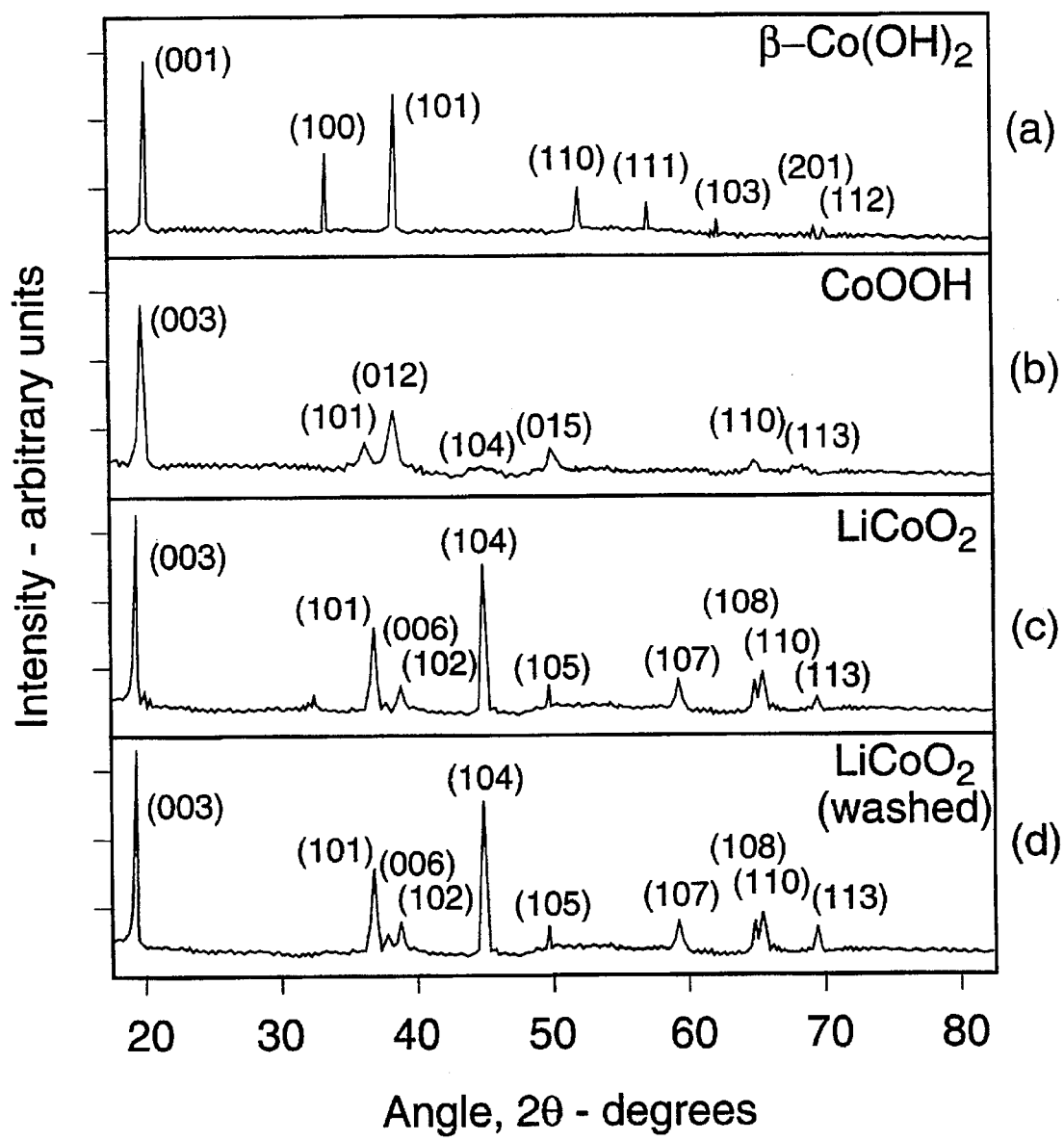
FIG. 2 shows the X-ray diffraction patterns of the respective precursor and reaction products in the method of preparing $LiCoO_2$ according to the present invention.

After the lithiated oxide is formed it may be rinsed in a suitable rinsing agent, for example, water, acetonitrile, an aqueous solution of tetramethyl ammonia hydroxide, or mixtures of the same. Excess LiOH is removed during the washing step. X-ray diffraction powder patterns for the β-Co(OH)$_2$ precursor, the CoOOH and $LiCoO_2$ products of reactions (4) and (3), and the washed $LiCoO_2$ are shown respectively at (a)–(d) in FIG. 2.

The lithiated material may further be heated to a temperature between 100° C. and 950° C. for a time sufficient to drive off interfering groups. Lithium cobalt oxide may also be annealed at a temperature of greater than 950° C. for a period of from 1 to 5 hours to further improve the capacity of the material.

The following are examples of the practice of the present invention. It will be appreciated by those skilled in the art that these examples are not to be construed as limiting the present invention, which is defined by the appended claims.

Example 1

Lithium cobalt oxide was prepared from a mixture 0.4 g of CoOOH and 0.4 g of LiOH.H$_2$O (2 times molar) with 0.4 ml of H$_2$O, providing a pH of about 14. The mixture was sealed in a quartz ampoule (25 ml capacity) and the synthesis reaction was carried out at a temperature of 100° C., generating a calculated pressure of about $6.6 \times 10^5$ Pa, for about 5 days.

Figure 3:
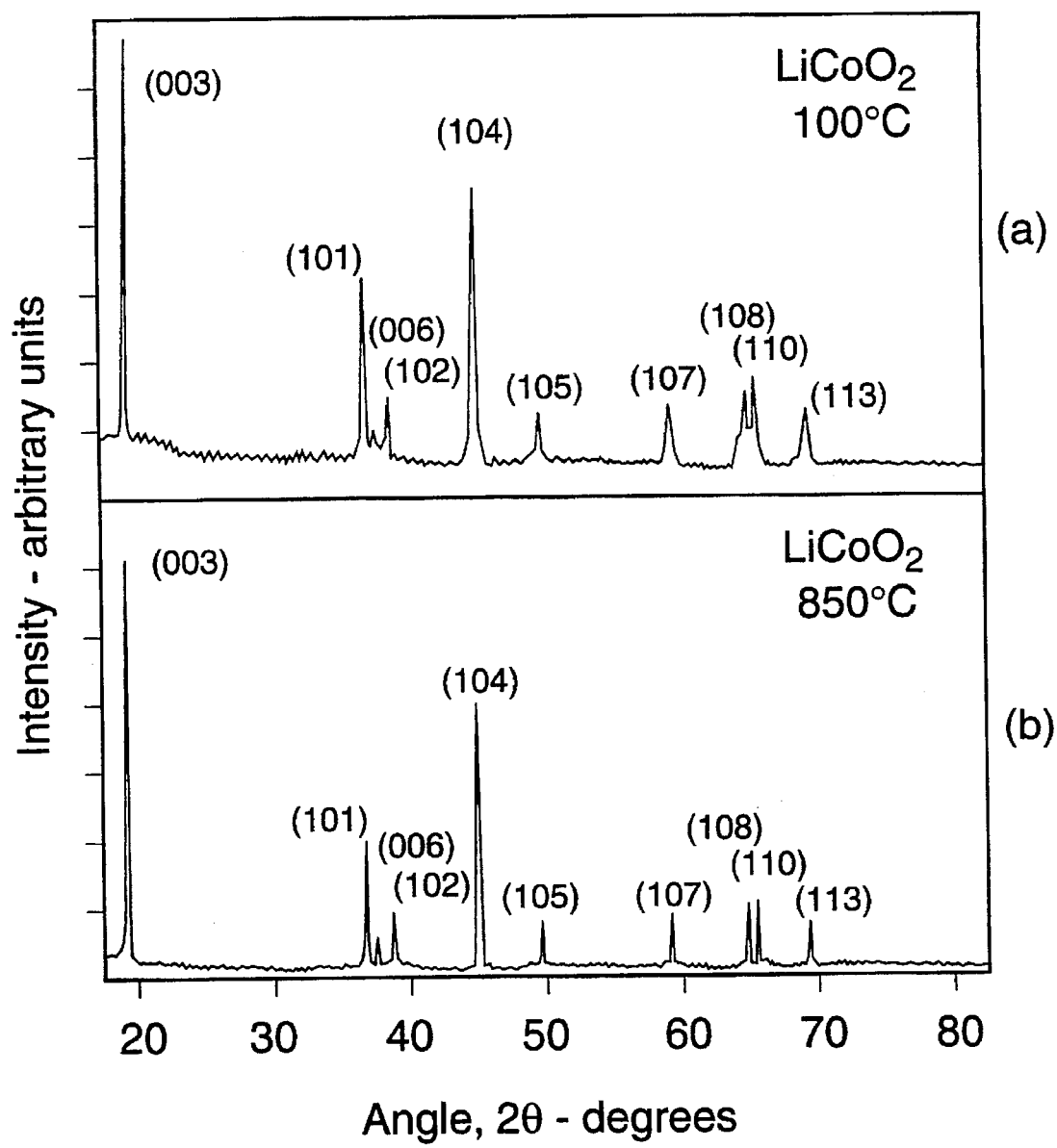
FIG. 3 shows the similarity of X-ray diffraction patterns of $LiCoO_2$ prepared according to the present invention and according to prior high temperature practice.

FIG. 3 compares X-ray diffraction pattern (a) of the $LiCoO_2$ formed in this example at 100° C. with X-ray diffraction pattern (b) of an $LiCoO_2$ formed according to prior practices at about 850° C. The lattice parameters of the example material are 2.8163±0.001 for the "a" value and 14.069±0.01 for the "c" value. These values agree with the JCPDS.

Example 2

2 g of $H_xCoO_2$, 2 g of LiOH.H$_2$O, and 10 ml of water, providing a pH of about 10, were measured into a glass receptacle which was then placed in an autoclave. The mixture was heated for 2 days at a temperature of about 140° C. and a pressure of $30–35 \times 10^5$ Pa. An X-ray diffraction pattern of the $LiCoO_2$ produced was substantially the same as that of the material of Example 1.

Example 3

Figure 4:
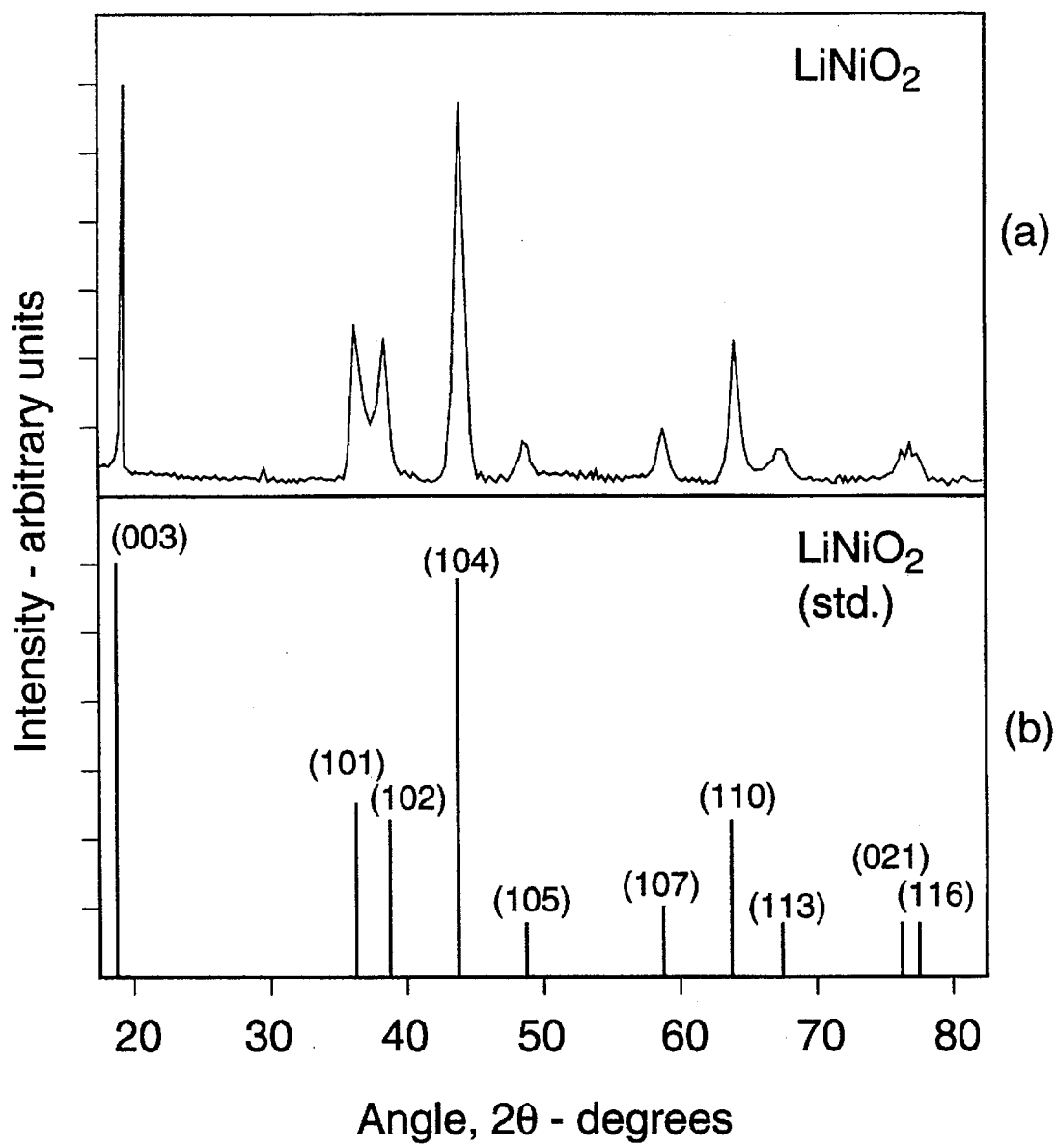
FIG. 4 shows an X-ray diffraction pattern of $LiNiO_2$ prepared according to the present invention, along with a standard $LiNiO_2$ pattern.

An $LiNiO_2$ material was formed in the same manner as in Example 1, except that NiOOH was used at a reaction temperature of about 140° C. The X-ray diffraction pattern for this material and a standard $LiNiO_2$ reference pattern are shown respectively at (a) and (b) in FIG. 4.

Example 4

To examine the electrochemical efficacy of the synthesized lithium metal oxide compounds, simple test cells were assembled using as the positive electrode a film of composition cast from a fluid dispersion comprising the finely-divided oxide compound with about 10% carbon and 5% binder polymer, such as polyvinylidene fluoride, in an organic solvent, e.g., 1-methyl-2-pyrrolidinone. A borosilicate glass paper separator element saturated with an electrolyte solution of 1M LiPF$_6$ in a 2:1 mixture of ethylene carbonate and dimethyl carbonate was then arranged between the positive electrode element and a lithium foil negative electrode element in a Swagelock test cell which compressed the electrode and separator elements into intimate contact. The resulting cell was then tested in the usual manner over charge/discharge cycles in the range of about 3 V to 4.5 V.

Figure 5:
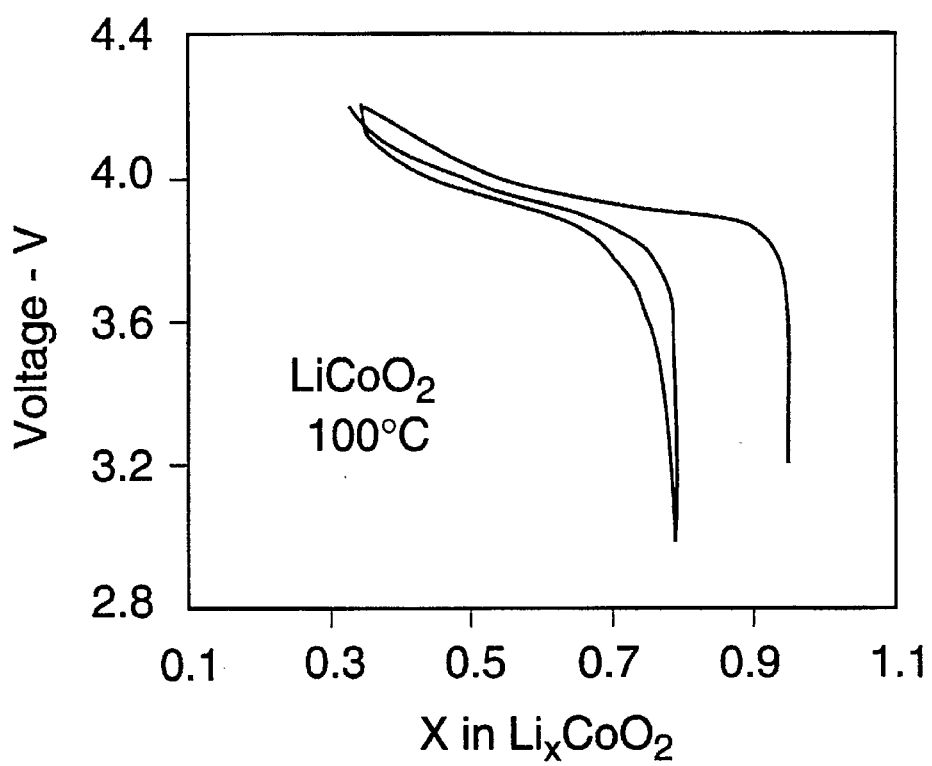
FIG. 5 shows the initial reversible cycling of a rechargeable battery cell comprising an electrode of $LiCoO_2$ prepared according to the present invention.
Figure 6:
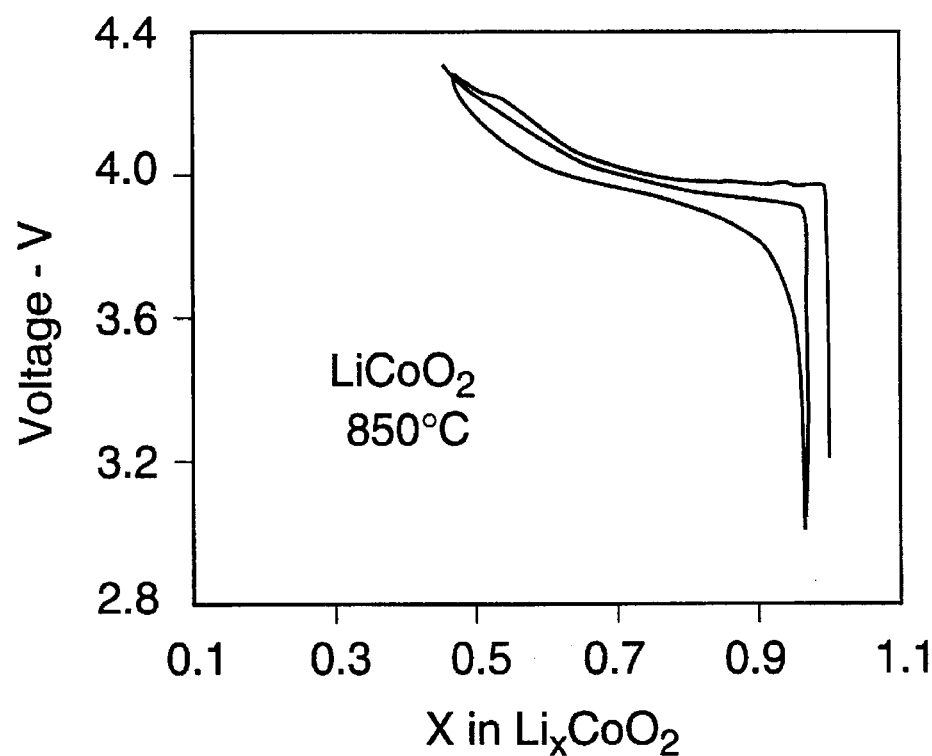
FIG. 6 shows the initial reversible cycling of a rechargeable battery cell comprising an electrode of $LiCoO_2$ prepared according to prior high temperature practice.
Figure 7:
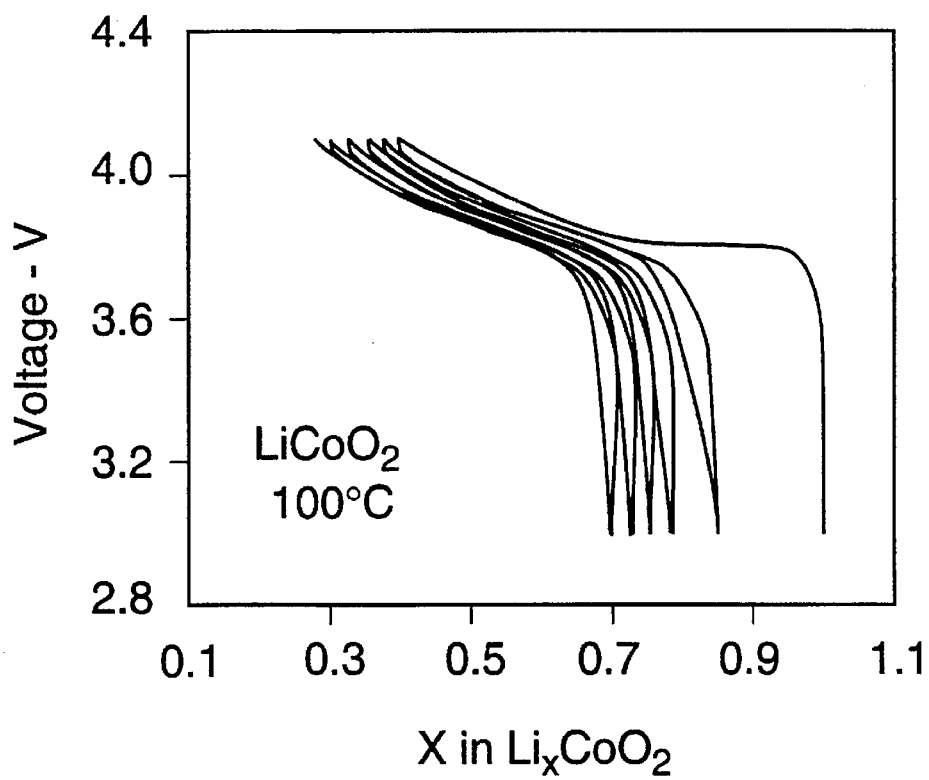
FIG. 7 shows extended reversible cycling of a rechargeable battery cell comprising an electrode of $LiCoO_2$ prepared according to the present invention.
Figure 8:
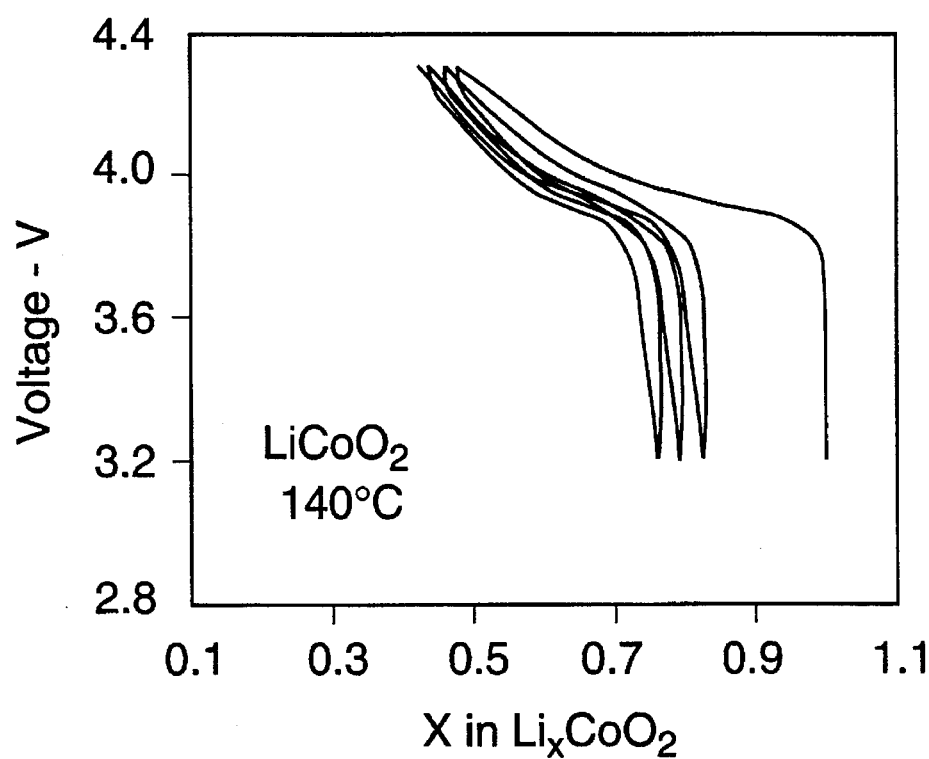
FIG. 8 shows extended reversible cycling of a rechargeable battery cell comprising an electrode of $LiCoO_2$ prepared according to another embodiment of the present invention.

The results of test cycling indicated that the initial reversible intercalation properties of a $LiCoO_2$ prepared according to Example 1 (FIG. 5) compared favorably with such a compound prepared at about 850° C. according to prior practice (FIG. 6). The exemplary results of extended cycling tests of the $LiCoO_2$ material of Example 1 and of the same material prepared in Example 2 are shown respectively in FIGS. 7 and 8.

Other embodiments of the invention will be apparent to those skilled in the art from consideration of the specification and practice of the invention disclosed herein.

What is claimed is:

1. A method of making a single phase layered alkali metal oxide material of the formula

$$H_xA_{1-x}MO_2$$

wherein A is an alkali metal of the group Ia, x is a number from 0.99 to 0, and M is a transition metal selected from the group consisting of CO and Ni, which method comprises reacting an alkali metal ion source in a basic solution with MOOH, wherein M is as defined above, in the presence of water and at a temperature of from about 50° C. to about 150° C. and a pressure greater than atmospheric.

2. The method of claim 1 wherein the alkali metal ion source is LiOH or LiOH.H$_2$O.

3. The method of claim 1 wherein the reaction pressure is from about $1 \times 10^5$ Pa to about $3 \times 10^6$ Pa.

4. The method of claim 3 wherein the reaction pressure is about $6 \times 10^5$ Pa.

5. The method of claim 3 wherein the reaction pressure is about $2 \times 10^6$ Pa.

6. The method of claim 1 wherein the reaction is carried out at a temperature of from about 80° C. to about 130° C.

7. The method of claim 1 wherein the reaction is carried out at a temperature of from about 100° C. to about 130° C.

8. The method of claim 1 wherein A is selected from the group consisting of Li, Na, or K.

9. The method of claim 1 wherein x is 0.

10. The method of claim 1 wherein x is less than 0.5.

11. A method of making a single-phase layered lithium metal selected from cobalt and nickel oxide material of the formula

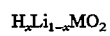
$$H_xLi_{1-x}MO_2$$

wherein x is a number of from the group consisting of 0.99 to 0 and M is a transition metal, which method comprises reacting a lithium ion source in a basic solution with MOOH, wherein M is as defined above, in the presence of water and at a temperature of from about 50° C. to about 150° C. and a pressure greater than atmospheric.

12. The method of claim 11 wherein the reaction time is from about 1 day to about 5 days.

13. The method of claim 11 wherein x is 0.

* * * * *